Figure 1:
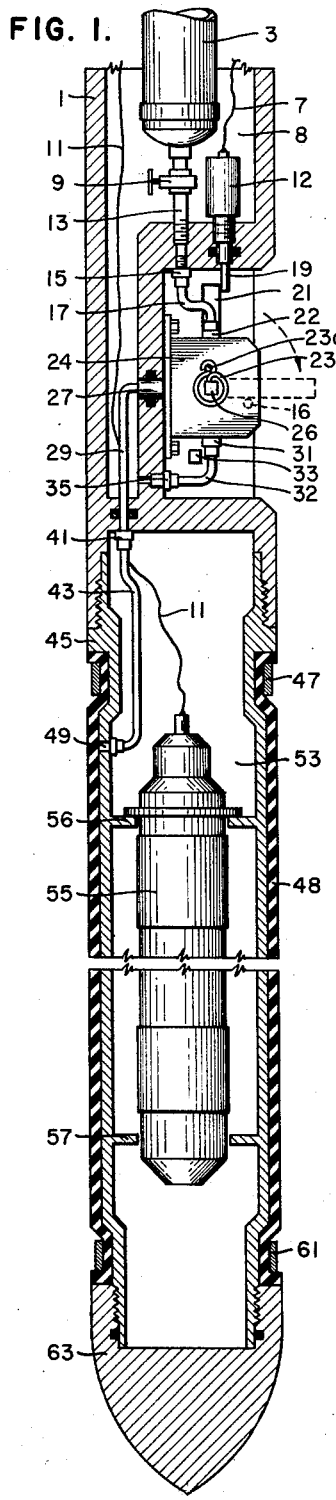

May 3, 1960

M. E. TRUE 2,935,615

WELL LOGGING TOOL FLUID DISPLACER

Filed June 24, 1957

INVENTOR.
Martin E. True,
BY
John B. Davidson
ATTORNEY.

United States Patent Office 2,935,615
Patented May 3, 1960

2,935,615
WELL LOGGING TOOL FLUID DISPLACER

Martin E. True, Harris County, Tex., assignor, by mesne assignments, to Jersey Production Research Company, Tulsa, Okla., a corporation of Delaware Application June 24, 1957, Serial No. 667,423

2 Claims. (Cl. 250—83.6)

This invention relates to radioactivity well logging, and more particularly to the reduction or elimination of the deleterious effects of well or borehole fluids on radioactivity logs.

In connection with permanent-type well completion techniques, it is desirable to obtain radioactivity logs of the portion of a cased borehole below a tubing lowered into the borehole and surrounding the casing. Manifestly, the log must be obtained by working from the surface through the tubing. To this end, a radioactivity logging device is lowered through the tubing by means of a wire line. It is apparent that the apparatus for obtaining the radioactivity logs must be of a substantially smaller diameter than that of the casing through which the log is made. Of necessity, radioactivity logging devices will be surrounded by borehole or well fluids, which may be water, drilling mud, or mixtures of oil, salt water and other fluids. Inasmuch as a substantial amount of radioactive logging material and petroliferous materials are carried by the fluids, the fluids will have a radioactivity of their own, which will interfere with the accuracy of the radioactivity log. Furthermore, since a given radioactive source will have an effect that is approximately inversely proportional to the square of the distance between the source and the measuring instrument, the well fluids will have a tendency to mask the radioactivity measurements of the earth formations surrounding the borehole.

To combat the effects of well fluids on radioactivity logs, it has been known to utilize springs in conjunction with radioactivity measuring means to bias the housing of the measuring device against the side of the borehole. In connection with devices of this nature, it has been necessary to utilize shielded measuring means so that measurements will be made only of radioactivity emanating from the side of the borehole contacted by the housing of the measuring device. Devices of this nature, however, are unsuitable for use in connection with wire line operations inasmuch as it is extremely difficult, if not impossible, to lower such an instrument into the well through a small diameter tubing and later to retrieve the instrument from the well. Additionally, it may be desirable to obtain a radioactivity log through a full 360° arc of azimuth around the borehole, in which case such devices manifestly are unsuitable.

Accordingly, one object of this invention is to provide improved apparatus for use in connection with radioactivity logging wherein the masking effects of drilling or well fluids are greatly reduced or obviated.

Another object is to provide apparatus for displacing fluids in the immediate vicinity of a radioactivity logging device between the housing of the device and the casing of the borehole.

Still another object is to provide a device for radioactivity logging that may be lowered to the formations to be logged through a tubing encircled by the borehole casing and wherein the masking effect of drilling fluids in the borehole are either greatly reduced or obviated.

Still another object is to provide a radioactivity logging device wherein the masking effect of drilling fluids or well fluids in the borehole are either greatly reduced or obviated, which is further adapted for the logging of the borehole through a full 360° arc of azimuth around the borehole.

Figure 2:
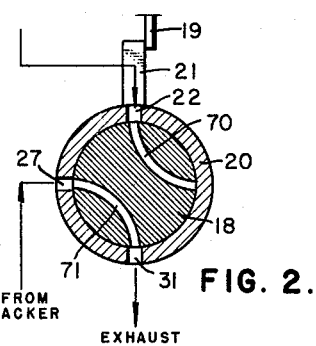
Figure 3:
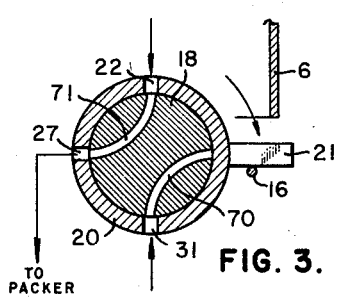
Figure 4:
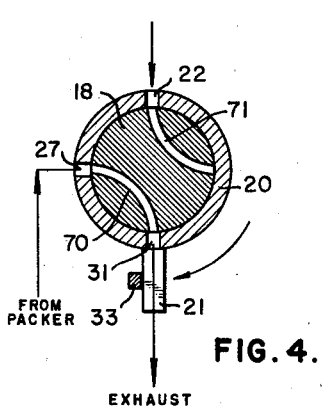
Figure 5:
Figure 6:
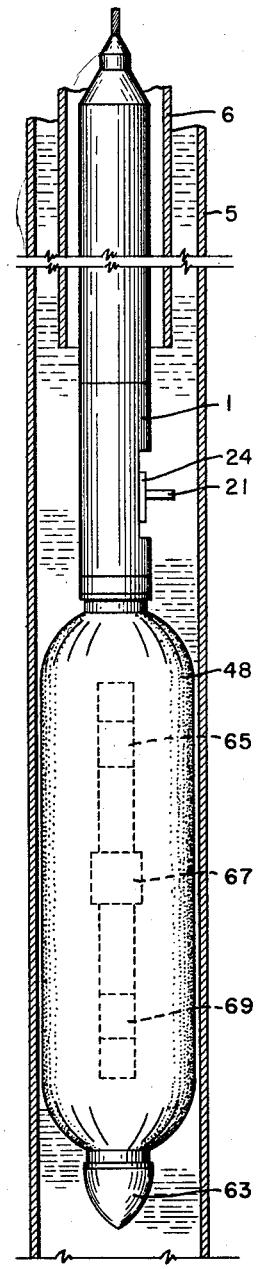

Other objects and a more complete understanding of the invention will be obtained from the following description thereof when taken in connection with the accompanying drawing wherein:

Fig. 1 is a side view partially in cross-section of an embodiment of the invention;

Figs. 2, 3, and 4 are cross-sectional views of a valve shown in Fig. 1, the valve being pictured in successive operating positions by the figures in the order speified above;

Fig. 5 is a cross-sectional view of a packer or bladder used in connection with the embodiment of Fig. 1; and Fig. 6 is a side view partially in cross-section showing the apparatus of Fig. 1 in its operating position in a borehole.

In accordance with one aspect of the invention, a radioactivity logging device, such as a radioactive source and a radioactivity detector vertically suspended in a housing adapted to pass through a tubing in a well, is at least partially surrounded by an inflatable bladder or packer which is adapted to be expanded by gaseous pressure to displace the fluid around the housing between the radioactivity logging means and the well casing. The inflatable bladder is inflated from a reservoir carried by the housing through a valve that is actuable to inflate the bladder only after the housing leaves the lower well of the tubing, and which is further actuable to exhaust the gas from the bladder by the operation of withdrawing the housing back up into the tubing.

According to a preferred embodiment of the invention, the valve is of the rotary type and is spring biased to rotate between positions at which the bladder is vented so as to minimize the differential pressure thereacross, through an intermediate position at which the gas reservoir is coupled to the interior of the bladder. The valve includes a handle by means of which the valve is restrained in its first position by an electromagnetically actuable latch (adapted to be actuated from the earth's surface) and in its second position by a shear pin or similar device adapted to be sheared or broken upon striking of the handle by the lower end of the tubing as the housing is withdrawn up into the tubing.

With reference now to the apparatus shown in Fig. 1, there is depicted a housing section 45 that screw-threadedly engages housing sections 1 and 63 to form a chamber 53 within which is supported a radioactivity logging tool 55. Housing section 1 supports a gas chamber 3, which is adapted to hold an inert non-hydrogeneous gas, such as nitrogen or carbon dioxide, at a pressure of at least several thousand pounds per square inch. Manually actuable valve 9 is provided for the purpose of retaining the gas in the chamber until the chamber is mechanically coupled to the housing 1 and the other apparatus to be described below.

Logging tool 55 is supported within chamber 53 by means of bolts or other suitable means that attach the tool to flanges 56 and 57. Electrical output signals from logging tool 55 are conducted to the earth's surface through insulated electrical line 11, the other electrical connection being made to the tool through the electrically conductive housing 1 in the usual manner.

An expansible, inflatable packer or bladder 48 is secured to the exterior of the housing member 45 by means of clamping sealing rings 47 and 61. The bladder substantially surrounds logging tool 45 and is constructed of neoprene or other similar oil resistant material. The packer in its non-inflated position should have a maximum diameter not substantially greater than the maximum diameter of the housing and of a substantially smaller diameter than the inner diameter of the tubing through which it must pass. In its preferred embodiment, the bladder should fold into a shape such as is shown in Fig. 5 so as to occupy a minimum amount of space when deflated and to readily expand when gaseous pressure is applied to the interior thereof.

Gas chamber 3 is coupled to the interior of bladder 48 through valve 9, tubing 13, fitting 15, tube or pipe 17, valve 24 having an inlet port 22 and outlet port 27, pipes 29 and 43 coupled together by fitting 41, and through port 49 in housing member 45. The function of valve 24 is to selectively couple the interior of bladder 48 to gas chamber 3 and to exhaust port 31 for the purpose of inflating or deflating the bladder responsive to operations at the earth's surface, as will be described. More specifically, valve 24 inflates bladder 48 upon energization of solenoid 12 after the apparatus has been lowered below the lower end of the tubing 6 (shown in Fig. 6), and deflates bladder 48 by the simple operation of retracting the logging apparatus up into the tubing. Exhaust port 31 may include a one-way check valve that will permit fluid flow only from the valve into line 32 or directly to the space between the logging instrument and the casing. As shown in Fig. 1, exhaust port 31 is coupled to the same chamber wherein gas chamber 3 is supported by means of line 32 and coupling member 35. This configuration may be used when it is undesirable to exhaust the gas within bladder 48 into the borehole or when it is desired to deflate bladder 48 by increasing well fluid pressure.

Solenoid 12 is energized from the earth's surface through electrical conductor 7, the electrical circuit being completed through housing 1 and another electrical conductor connected thereto in the usual manner.

The details of valve 24 may be best understood by considering Figs. 1, 2, 3, and 4 together. In a preferred embodiment, the valve is of the rotary four-way type consisting of an outer member 20 and a rotatable inner member 18. The rotatable inner member 18 is biased for clockwise rotation, as viewed, by spring member 23. One end of spring member 23 is secured to the valve housing by means of a pin 23a and the other end of the spring is secured to the rotatable inner member 18 by an extension 26 thereof. An arm 21 is affixed to the rotatable inner member 18 and held against clockwise rotation at the various operating positions thereof by means of solenoid extension 19, shear pin 16, and lower stop member 33.

Inner member 18 of the valve has two passageways, 70 and 71, adapted to selectively couple together inlet port 22 and outlet port 27, or outlet port 27 and exhaust port 31 in accordance with the position of inner member 18 relative to outer member 20. As can be seen in Fig. 2, when solenoid arm 19 restrains valve arm 21 against clockwise rotation, gas outlet port 27 is coupled to exhaust port 31 by passageway 71, while inlet port 22 is dead-ended against the inner surface of outer member 20 by passageway 70. When shear pin 16 restrains valve arm 21 against clockwise movement (i.e., after the inner member 18 has rotated 90° from the position shown in Fig. 1), inlet port 22 ad outlet port 27 will be coupled together by passageway 71 to permit flow of gas from chamber 3 to the interior of bladder 48. This condition is shown in Fig. 3. When shear pin 16 has been sheared by raising the logging instrument so that the lower edge of the tubing strikes arm 21, inner valve member 18 will rotate through 90° to the position shown in Fig. 4, at which outlet port 27 is coupled to exhaust port 31 by passageway 70 so that the bladder 48 can be deflated. Stop member 33 will prevent further rotation of arm 21 until the logging instrument reaches the surface, at which time the valve may be reset to the position shown in Fig. 2, and shear pin 16 may be replaced so that the instrument may be used again.

As shown in Fig. 6, the radioactivity logging device itself may comprise a source of radioactive emanations 69, such as a neutron source and a radioactivity detector 65, separated by a shield 67 to prevent reception of radioactive particles by detector 65 directly from source 69. Alternatively, a simple radioactivity detector may be used alone if it is desired to detect the natural radioactivity in the earth's subsurface layers.

It is to be noted that bladder or packer 48 should inflate to a maximum diameter somewhat less than the minimum diameter of the casing or borehole to be logged, in order to permit free passage of the apparatus through the borehole or casing.

In operation, valve arm 21 is initially set to the position shown in Figs. 1 and 2 whereat solenoid arm 19 restrains valve arm 21 against clockwise rotation. This insures that the bladder 48 will be completely deflated during its passage through tubing 6. Valve 9 is opened so that the gas pressure within chamber 3 is controlled entirely by valve 24. The instrument is thereupon lowered through the tubing until it emerges from the lower end thereof. Solenoid 12 is energized to retract solenoid arm 19 upwardly. Valve arm 21 rotates through 90° until restrained by shear pin 16 and gas pressure is applied to interior of bladder 48. The bladder will inflate, as shown in Fig. 6, and the fluid around radioactivity logging device 55 will be substantially entirely displaced. After the logging operation has been completed, the apparatus is retracted upwardly with sufficient velocity so that pin 16 will be sheared when arm 21 strikes the lower end of tubing 6. Valve arm 21 will rotate to the position shown in Fig. 4. After an appropriate interval for deflation of bladder 48, the apparatus is further withdrawn upwardly into and through the tubing 6 to the earth's surface. If exhaust port 31 is coupled to chamber 8, as shown in Fig. 1, the fluid pressure around the instrument may be increased to insure complete deflation of bladder 48 prior to retraction of the bladder into the tubing 6.

Manifestly, the objects set forth above wil be accomplished by means of the invention as described. Since the fluids in the well or borehole are almost completely displaced by bladder 48, they can in no way interfere with the accuracy of the radioactivity logs that will be obtained by the instrument. The apparatus may be utilized in connection with permanent-type well completion procedures since the instrument is of sufficiently small diameter with bladder 48 deflated to readily pass through the relatively small diameter tubings utilized therewith. Since no shielding against radioactivity is necessary other than shield 67, the invention is adapted for the logging of the borehole through a full 360° arc of azimuth around the borehole.

The invention is not to be restricted to the specific structural details, arrangement of parts, or circuit connections herein set forth, as various modifications thereof may be effected without departing from the spirit and scope of this invention.

What is claimed is:

1. Apparatus for radioactivity logging of a borehole having a casing enclosing a tubing traversing said borehole to a preselected depth thereof; said apparatus comprising: a housing enclosing radioactivity logging means; an expansible packer member sealed to the exterior of the said housing alongside and at least partially surrounding said radioactive source and radioactivity detector, said packer being adapted to be expanded by gaseous pressure between said housing and the interior of said packer member to a diameter not greater than the inner diameter of said casing; a chamber for storing pressurized gas; rotary valve means including a valve arm for selectively coupling the interior of said packer to said chamber, said rotary valve means having a first position whereat the interior of said packer is isolated from said chamber, a second intermediate position whereat said chamber is coupled to the interior of said packer member to inflate said packer and displace the fluid between said housing and said casing and a third position whereat the interior of said packer is vented to deflate said packer; spring means for biasing said valve toward said third position through said second intermediate position; an electromagnetically releasable latch for restraining said valve in said first position, said latch being adapted to release said valve upon energization of the electromagnetic means thereof; a shear pin engaging said valve arm for restraining said valve in said second position, said pin being adapted to be sheared by raising said apparatus into said tubing to allow said spring means to bias said valve to said third position.

2. Apparatus for radioactivity logging of a borehole enclosing a tubing traversing the borehole to a preselected depth thereof, said apparatus comprising: radioactivity logging means; a housing enclosing said radioactivity logging means; an expansible packer member sealed to the exterior of said housing alongside and at least partially surrounding said radioactivity logging means, said packer being adapted to be expanded by gaseous pressure therewithin; a chamber within said housing for storing pressurized gas; valve means connected to said packer and to said chamber having a first position whereat said packer is isolated from said chamber, a second position whereat the interior of said packer is coupled to said chamber for the purpose of inflating said packer, and a third position whereat gas within said packer is vented to deflate said packer; and an actuating arm connected to said valve means adapted to hold said valve means in the first position thereof as said housing traverses said tubing, to actuate said valve means to the second position thereof responsive to passage of said housing out of the lower end of the tubing, and to actuate said valve means to the third position thereof by striking the lower end of the tubing as said housing is retracted into said tubing; and spring biased holding means for holding said arm in the first position and allowing said arm to rotate into the second position of said valve after said arm has passed out of the lower end of the tubing.

References Cited in the file of this patent

UNITED STATES PATENTS

| | | |
|---|---|---|
| 2,629,446 | Freling et al. | Feb. 24, 1953 |
| 2,652,496 | Herzog et al. | Sept. 15, 1953 |
| 2,655,038 | Barton | Oct. 13, 1953 |
| 2,747,100 | Wyllie | May 22, 1956 |
| 2,829,518 | Rumble et al. | Apr. 8, 1958 |